March 25, 1958 E. W. DETJEN 2,827,773
AUTOMATIC FEEDING MECHANISM FOR MIX FOR
CUSTARD MAKING MACHINES
Filed Oct. 11, 1954 6 Sheets-Sheet 1

INVENTOR
EDGAR W. DETJEN

BY *Manng Wright*

ATTORNEYS

March 25, 1958

E. W. DETJEN 2,827,773

AUTOMATIC FEEDING MECHANISM FOR MIX FOR
CUSTARD MAKING MACHINES

Filed Oct. 11, 1954

INVENTOR
EDGAR W. DETJEN

BY

ATTORNEYS

March 25, 1958

E. W. DETJEN 2,827,773

AUTOMATIC FEEDING MECHANISM FOR MIX FOR
CUSTARD MAKING MACHINES

Filed Oct. 11, 1954

INVENTOR
EDGAR W. DETJEN

BY

*Young & Wright*

ATTORNEYS

March 25, 1958  E. W. DETJEN  2,827,773
AUTOMATIC FEEDING MECHANISM FOR MIX FOR
CUSTARD MAKING MACHINES
Filed Oct. 11, 1954  6 Sheets-Sheet 5
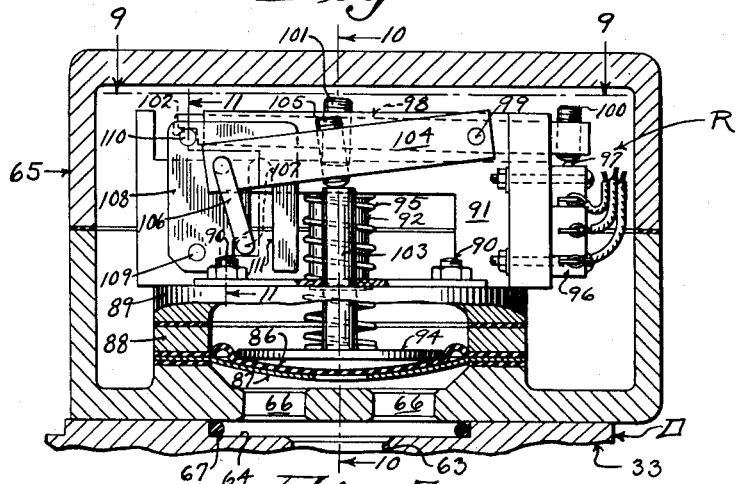
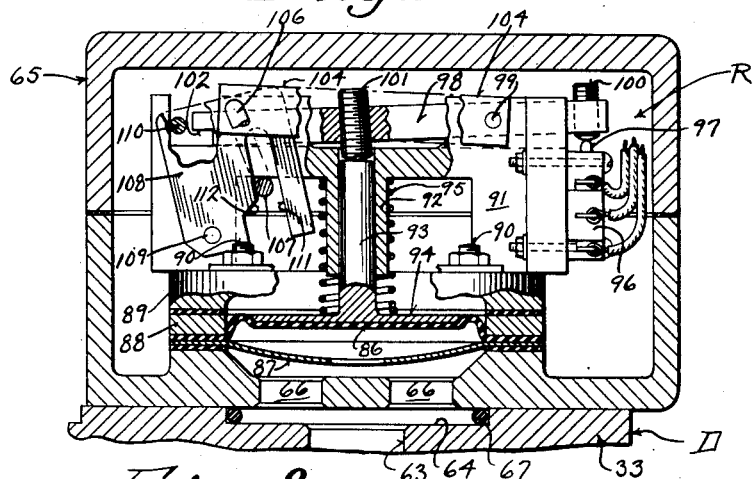
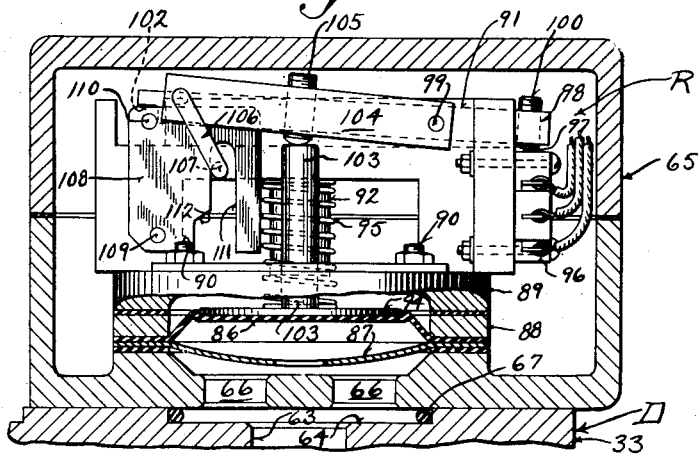
INVENTOR
EDGAR W. DETJEN
BY
ATTORNEYS March 25, 1958
E. W. DETJEN
2,827,773
AUTOMATIC FEEDING MECHANISM FOR MIX FOR
CUSTARD MAKING MACHINES
Filed Oct. 11, 1954
6 Sheets-Sheet 6
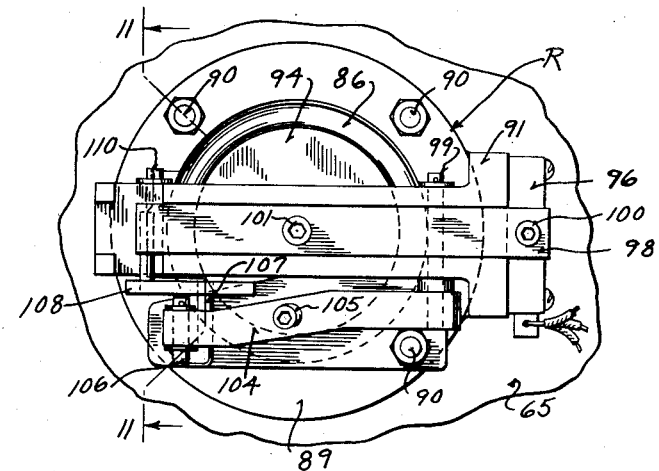
INVENTOR
EDGAR W. DETJEN
BY
*Young & Wright*
ATTORNEYS United States Patent Office 2,827,773
Patented Mar. 25, 1958

2,827,773

AUTOMATIC FEEDING MECHANISM FOR MIX FOR CUSTARD MAKING MACHINES

Edgar W. Detjen, Kiel, Wis., assignor to Stoelting Brothers Company, Kiel, Wis., a corporation Application October 11, 1954, Serial No. 461,508

13 Claims. (Cl. 62—2)

This invention appertains to frozen custard and like frozen product making machines, wherein the desired liquid mix is introduced into a freezing cylinder, aerated by the addition of air under pressure from a pump, frozen and then dispensed. Such machines are in wide use and have met with universal acceptance. However, the machines are open to certain objections, such as the control of the amount of the mix introduced into the freezing cylinder, the proper aeration thereof, etc.

One of the primary objects of my invention is to provide an automatic means for introducing the desired amount of mix into the freezing cylinder at the correct time according to the requirements of the machine itself, so that the frozen product will be in proper condition for dispensing at all times during the work day.

The most desirable operating condition of a custard making machine is where the freezing (evaporator) cylinder is approximately one-fourth full of mix, with the mix beaten and frozen in the presence of air to properly aerate the product. Obviously, if the mix is not aerated sufficiently, the frozen product will be too thick and will not present a pleasing appearance or taste and the cost of the product will be high. On the other hand, if the mix is aerated to too great an extent, the product will be too light or fluffy and will not meet with consumer approval.

It is difficult or impossible to govern the exact time and amount of mix to be introduced into the freezing cylinder according to the amount of the frozen product in the cylinder, in that the frozen product is distributed unevenly in the cylinder and cannot be accurately measured.

It is, therefore, another salient object of my invention to provide novel means for governing the automatic flow of a mix into the cylinder; which means is controlled according to the changes in the volume of air in the cylinder.

Another important object of my invention is to provide a novel mechanism for reading the air volume and for controlling the flow of mix according to its findings.

A further important object of my invention is the provision of means for permitting operation of the pump for the mix irrespective of the fact whether the reading mechanism is calling for mix or not, so that the mix will be pulsated back and forth from the pump to the container for the mix in a refrigerator compartment, whereby the mix will be constantly agitated to prevent settling of ingredients of low specific gravity to the bottom of the container.

A still further object of my invention is to provide a device of the above character which will be of a compact nature, so that the same can be incorporated with custard making machines of the type now already on the market and which will be durable and efficient in use and need little or no attention from an attendant.

Wtih these and other objects in view, the invention consists in the novel construction, arrangement and formation of parts, as will be hereinafter more specifically described and claimed and illustrated in the accompanying drawings, in which drawings, Figure 1 is a side elevational view showing my novel mechanism and volume control incorporated with a custard making machine of a type now in common use, parts of the machine being shown broken away and in section to illustrate structural detail;

Figure 6 is an enlarged detail sectional view through the reading mechanism for the volume of air in the freezing cylinder, the view being taken on the line 6—6 of Figure 2, looking in the direction of the arrows and showing the switch for the solenoid operated valve in its closed position;

Figure 7 is a view similar to Figure 6, but showing the switch operating lever tripped and the switch in its open position;

Figure 8 is a view similar to Figure 6, but showing the diaphragm of the reading mechanism being lifted by increased air pressure to actuate and close the switch for the solenoid operated check valve;

Figure 9 is a fragmentary horizontal sectional view taken on the line 9—9 of Figure 6, looking in the direction of the arrows, the operating parts of the reading mechanism being shown in top plan;

Figure 10 is a detail vertical sectional view taken at right angles to Figure 6 and on the line 10—10 of Figure 6, looking in the direction of the arrows, and Figure 11 is a detail fragmentary sectional view taken through the reading mechanism and on the line 11—11 of Figure 6, looking in the direction of the arrows, the view illustrating the latching mechanism for the switch operating lever.

Referring to the drawings in detail, wherein similar reference characters designate corresponding parts throughout the several views, the letter C generally indicates a custard or like making machine, and D my improved device for automatically controlling the flow of a liquid mix to the machine C.

Figure 5:
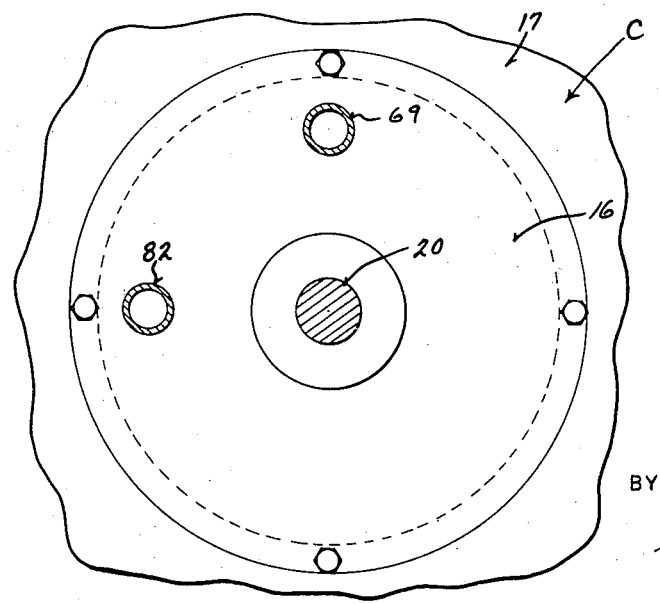
Figure 5 is a fragmentary end elevational view of the inner end of the freezing cylinder, the view illustrating the entrance conduits for the air and the liquid mix into the freezing cylinder, the conduits and the shaft for the feed and mixing screw of the cylinder being shown in section.

The custard making machine can be considered as an approved type now found on the open market, and will not be described in minute detail, but the same includes a base casing 15 in which is housed the motors and freezing equipment for the machine. A freezing or evaporator cylinder 16 is mounted longitudinally of the casing 15 on the upper end thereof and is housed within an ornamental casing 17. A dispensing spigot 18 and other controls, including a foot pedal 18', are located at the front of the machine. Rotatably mounted within the cylinder is a feed and mixing screw 19 and its shaft 20 extends out through the rear end of the cylinder 16 and is driven in an approved manner under certain controls from a drive electric motor (not shown). By referring to Fig. 5, it can be seen that the rear end of the cylinder 16 also extends through the rear end of the casing 17.

Forming a part of my device D is a speed reducing mechanism 21 of a desired type for operating certain parts of the device, as will more fully appear later. It is to be noted, however, that the input shaft 22 of the speed reducing mechanism is actuated from a pulley belt 23 driven from a desired motor of the custard making machine C. The output shaft 24 of the speed reducing mechanism has connected thereto a crank 25, which in turn actuates a pitman rod 26. This pitman rod is operatively connected to an oscillating operating lever 27. The lower end of the operating lever is mounted for rocking movement on a pivot pin 28 carried by a suitable bracket. The speed reducing mechanism and associate parts are housed within the base casing 15. The upper end of the lever extends above the base casing and has pivotally connected to its opposite sides operating links 29 and 30, the purpose of which will be more fully described.

The device D includes a reading mechanism R for the volume of air in the freezing cylinder 16 and a pump 31 for the liquid mix and a pump 32 for the compression of air in the freezing cylinder. The reading mechanism R and the pumps 31 and 32 are all mounted on and supported by a frame casting 33 which is bolted, as at 34, or otherwise fastened to a part of the rear wall of the housing 17, at one side of the freezing cylinder 16, as will be described in more detail. Forming the lower part of the casting 33 is a cylindrical guide sleeve 35 receiving the piston 36 of the pump 31 for the liquid mix. This piston 36 is of the cylindrical plunger type and operates within a cylinder 37. This cylinder 37 can be fabricated from stainless steel and is rigidly secured in an enlarged portion 38 of the bore of the guide sleeve 35, and it is to be noted that the plunger or piston 36 is of a less diameter than the interior diameter of the cylinder, and that the cylinder has formed in its inner end a port 39 which communicates with a vertical way 40 in the casting. The guide sleeve has its outer end closed by a plate 41 which holds an O-ring 42 or like gasket snugly around the piston 36. The plate 41 is provided with openings which receive screws 43 secured to the sides of the guide sleeve. Winged nuts 44 are threaded on the screws 43 against the plate. The extreme outer end of the piston 36 is reduced in diameter to form a piston rod 45 and this rod is operatively connected to its operating link 29 by a pivot pin 46.

The pump 32 for the air includes a cylinder 47 which can be fabricated from stainless steel, if such should be preferred. The inner end of the cylinder is firmly secured to a mounting ring 48 which encircles the cylinder and this mounting ring 48 receives the holding bolts 34 heretofore mentioned. In assembling, the cylinder 47 extends through an opening in the end wall of the housing 17 and the mounting ring abuts the outer face of said end wall. The inner end of the cylinder fits tight against the inner face of the casting 33 and an O-ring or the like 49 can be interposed between the mounting ring 48 and the casting to insure an air-tight joint. This mounting ring has rigidly secured thereto in any desired way, outwardly extending headed studs 50 (see Figure 2) and these studs extend on opposite sides of the casting 33. The casting 33 also has formed therein a cylindrical guide bore 51 and mounted for reciprocatory movement in this guide bore is a piston rod 52, carrying at its inner end a piston head 53 and this piston head embodies a cup type leather washer 54 and mounting plates therefor. The rod 52 extends out and beyond the casting 33 and receives a lock nut 55 which bears against a washer 56. This washer holds in place an O-ring seal 57 for the piston rod 52. The lock nut 55 is threaded within a lock plate 58 and this lock plate includes radially extending hook shaped arms 59 which engage under the heads of the studs 50 and the lock plate 58 serves to lock the casting 33 and its associate parts to the housing 17 by the screws 34. The piston rod 52 has its outer end operatively connected to its operating line 30 by means of a pivot pin 60. From the description so far, it can be seen that the pistons of the pump 31 for the mix and the pump 32 for the air, are operated in synchronism by the operating lever 27.

The outer end of the cylinder 47 is provided with an air port 61 and a breather opening 62. The inner end of the cylinder communicates with a passageway 63 formed in the casting 33. The upper end of this passageway 63 opens into a cavity 64 formed in the upper end of the casting 33. This cavity is closed by a housing 65 forming a part of the reading mechanism R, and this housing encloses certain operative parts of the reading mechanism. This housing will be more fully described, but it is to be noted that the bottom wall of the housing 65 is provided with apertures 66, so communication is established between the way 63 and the interior of the housing 65 provision of a sealing gasket, such as an O-ring 67 interposed between the housing 65 and the casting 33 around the cavity prevents the escape of air from between the casting and the housing. The passageway 63, below the cavity 64 is provided with a laterally extending branch passageway 68 and fitted within the passageway 68 is a conduit tube 69 which leads directly into the freezing cylinder 16 for the liquid mix (see Figure 5). It is to be noted that the tube 69 enters into the cylinder 16 adjacent to the upper end thereof.

Now referring back to the pump 31 for the liquid mix and the passageway 40 leading from the inner end of the cylinder 37 of this pump, it is to be noted that this passageway 40 also communicates with a cavity 70 formed in the upper end of the casting 33. This cavity is also closed by a part of the housing 65 and this part of the housing 65 encloses certain control valves, as will be later described. Leakage from the cavity 70 to the outside atmosphere is prevented by a sealing gasket 71 interposed between the housing 65 and the casting 33 and this gasket is placed around the cavity. Communicating with the passageway 40 is a branch passageway 72 and securely fitted within the passageway 72 by suitable couplings is a flexible conduit pipe or tube 73 which leads to a container for the liquid mix (not shown), ordinarily kept in a refrigerator compartment. The wall of the passageway 72 at its point of communication with the cavity 70 is provided with a valve seat 74. A cylindrical valve body 75 is employed for this seat and when the valve is in its lowered closed position communication between the passageway 40 and the passageway 72 is interrupted. At this point, it is to be noted that the valve body 75 constitutes the plunger of a solenoid coil 76 the circuit for which is opened and closed by the reading mechanism R. The casing 65 encloses the solenoid 76 and its plunger valve 75, it being understood however, that the lower end of the plunger valve 75 slidably extends through the bottom of the casing 65 for movement on and off its seat 74. Also formed within the casing 65 at one side of the solenoid 76 is a vertically extending passageway 77 and this passageway opens into the cavity 70 and the passageway 40. Formed on the wall of the passageway 77 at its lower end is a valve seat 78 normally closed by a ball check valve 79. In order to insure the proper seating of the ball valve a weight 80 of a selected mass engages the ball. The upper end of the vertical passageway 77 has communication with a coupling 81, which in turn has connected therewith a tube 82 for the mix and this tube 82 enters into the freezing cylinder 16 at a point below the connection of the air conducting tube 69 with the cylinder 16. Obviously, when the ball 79 is on its seat, communication of the pump for the liquid mix and the freezing cylinder is interrupted.

Figure 1:
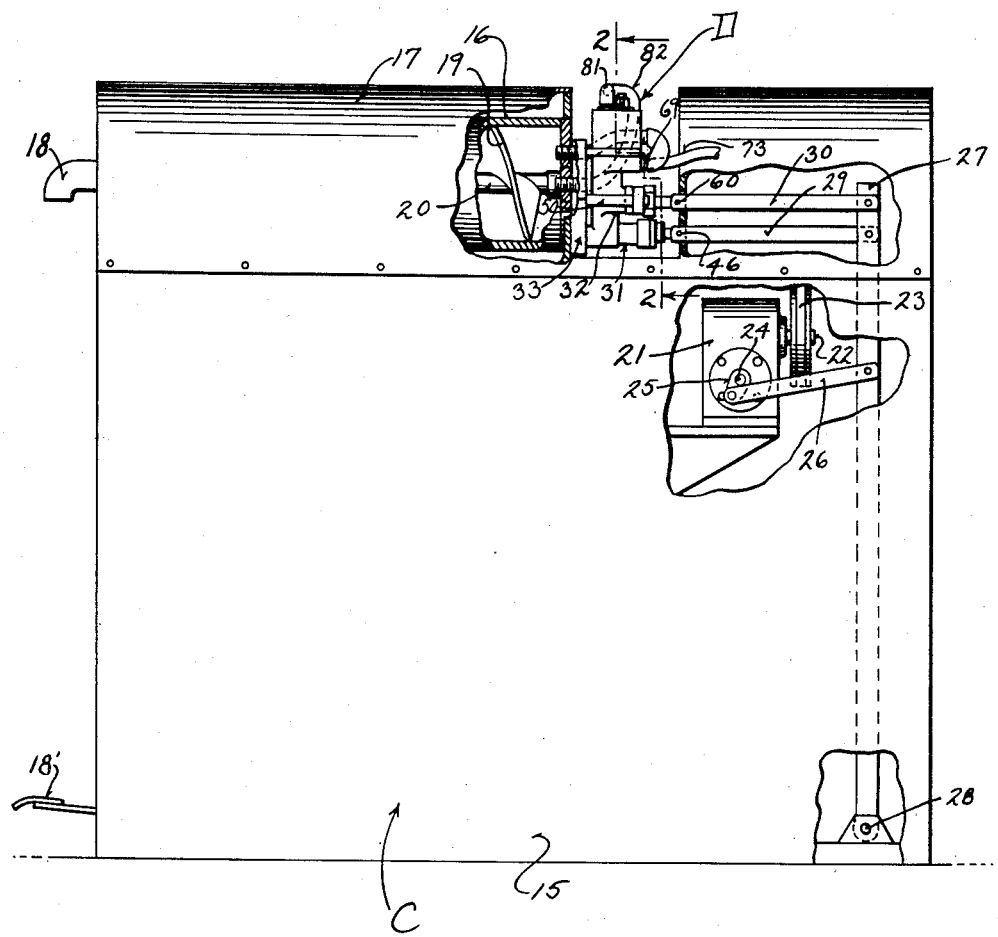
Figure 2:
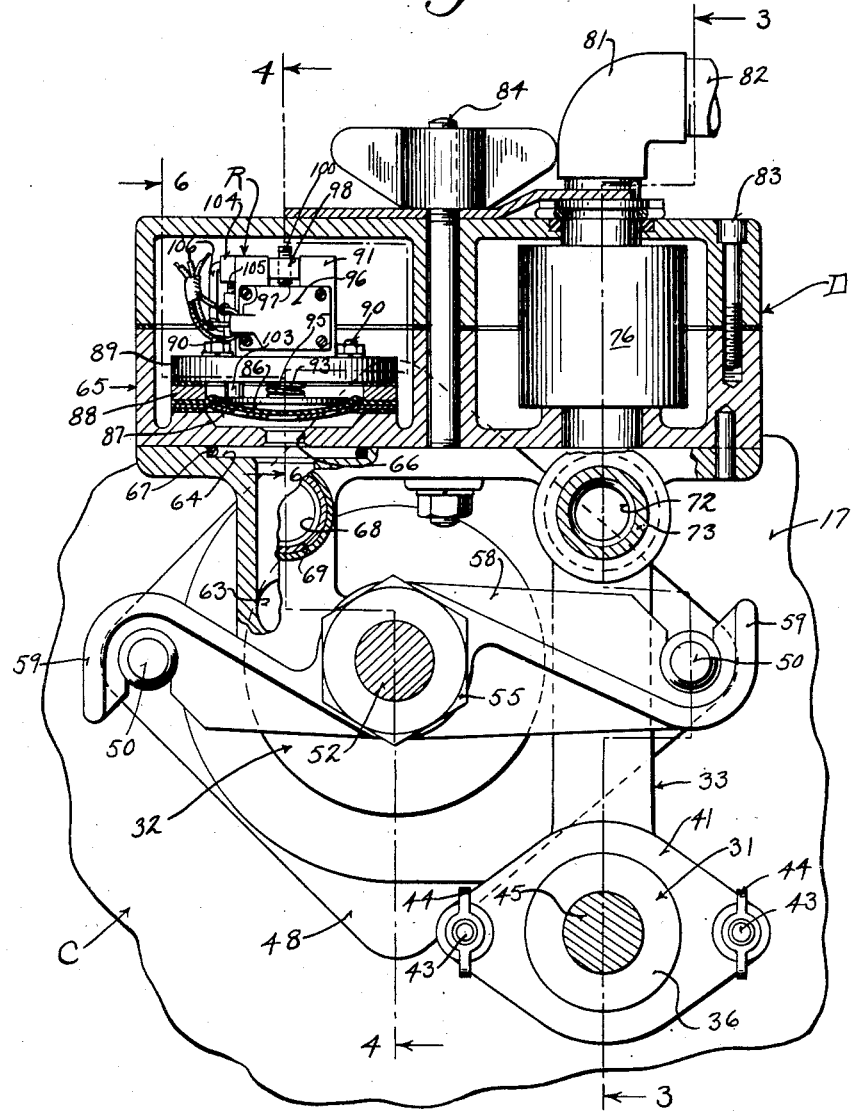
Figure 2 is an enlarged fragmentary detail vertical sectional view taken on the line 2—2 of Fig. 1, looking in the direction of the arrows, the view showing the diaphragm actuated switch in its closed position for energizing the solenoid to lift the check valve for the mix to a raised position.
Figure 3:
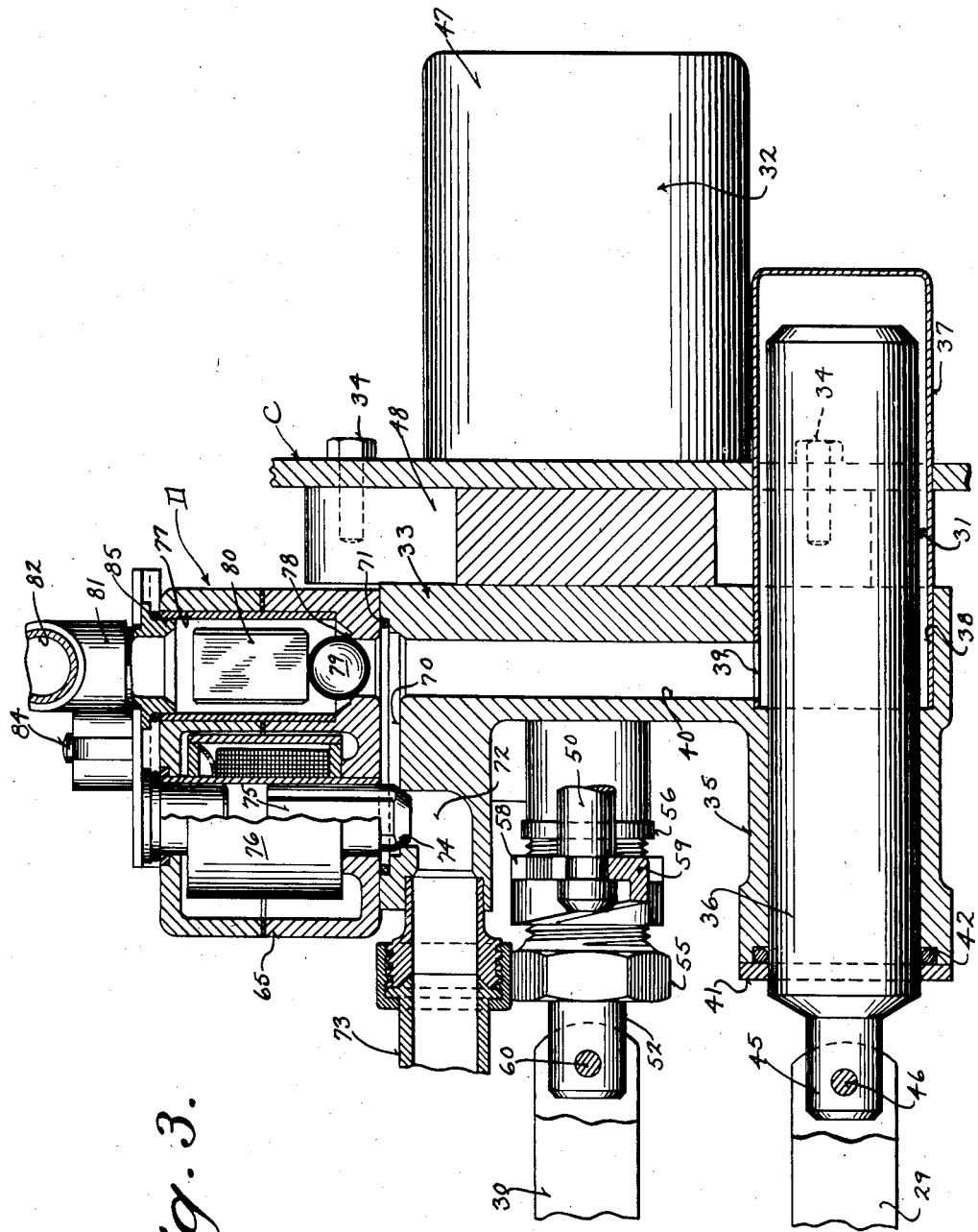
Figure 3 is a view through my improved mechanism taken at right angles to Figure 2 and on the line 3—3 of Figure 2, looking in the direction of the arrows, the view, however, showing the solenoid actuated check valve for controlling the flow of the mix in its lowered position.
Figure 4:
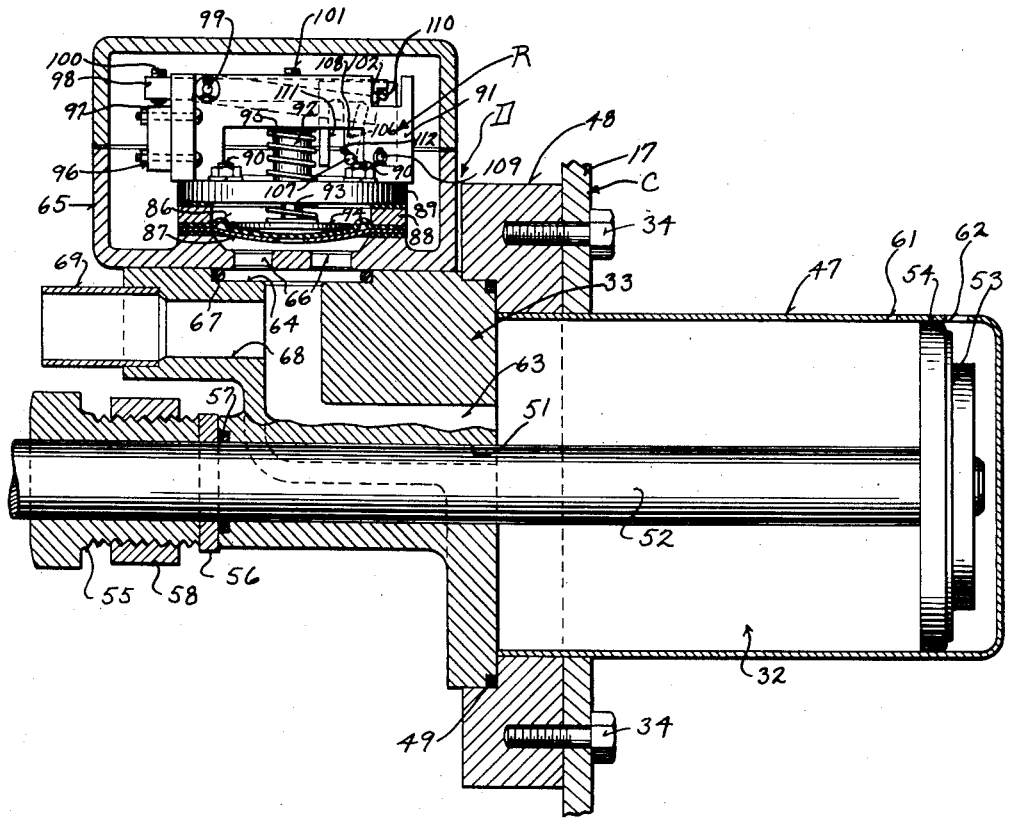
Figure 4 is a fragmentary detail longitudinal sectional view through the improved device similar to Figure 3, but taken on the line 4—4 of Figure 2, looking in the direction of the arrows, the switch being shown in its closed position.

For the sake of assembly, the casing 65 is made in upper and lower sections, as best shown in Figures 2 and 3, and these sections are rigidly connected together by machine screws 83. The casing itself is securely fastened to the casting 33 by a bolt 84. In order to exclude the possibility of any leakage of the liquid mix, the passageway 77 can be provided with a bushing 85 fitted tightly against the wall of the passageway by the sections of the casing 65.

Now referring to the reading mechanism R the same includes a flexible diaphragm 86, which is affected by air pressure caused by various volumes of air in the freezing cylinder. The diaphragm normally rests against a bottom supporting plate 87 which is suitably apertured for the flow of air therethrough. The diaphragm 86 and its supporting plate 87 are rigidly clamped together and held in place at their peripheries by an annular clamp ring 88. Fitted on top of this ring 88 is a supporting and guide bracket plate 89 and all of these parts are held in their assembled position by machine bolts 90 (see Figures 9 and 11), which are threaded into the lower wall of the housing 65. It is to be noted that the lower wall of the housing has formed on its inner surface an annular boss surrounding the openings 66 and that the bolts 90 extend into the boss and hold the diaphragm 86 directly above the openings 66. Formed on the bracket plate 89 is an inverted U-shaped supporting bridge 91 which constitutes a frame and a guide for certain parts of the reading mechanism. The central part of the bridge 91 has formed thereon a depending guide sleeve 92 and slidably mounted in this guide sleeve is the diaphragm plunger rod 93. The plunger rod 93 carries at its lower end a flat bearing head 94 which engages the diaphragm 86 at all times and the plunger 93, its head 94 and the diaphragm 86 are normally held in a lowered position by an expansion spring 95 which is coiled about the guide sleeve 92. The opposite ends of this spring bear respectively against the bridge 91 and the plunger head 94. It is to be noted that the guide sleeve 92 opens out through the top of the bridge 91 so that the upper end of the plunger 93 will be exposed for a purpose which will later appear. Rigidly mounted on the bridge 91 at one side thereof is an electric switch 96 preferably of the micro type and hence the switch is provided with a switch plunger 97 normally held in a raised position with the circuit open, and it is to be understood that the micro switch is in proper electrical connection with the solenoid 76 and that when the switch is open the solenoid is not energized and the plunger valve 75 is in its lowered closed position. When the switch is closed, an electric circuit is closed through the solenoid and the solenoid is energized and the plunger valve 75 is raised above its seat. This switch also controls a signal light (not shown) for the operator of the machine to indicate whether the machine is low on mix and whether or not the mix is being fed to the machine. In order to operate the switch plunger 97 to a lowered circuit closing position, a switch operating lever 98 is provided and this lever is rockably mounted adjacent to its outer end on a pivot pin 99 carried by the bridge 91. The outer end of the lever beyond its pivot point overlies the plunger 97 and is provided with an adjustable bearing screw 100 directly above the switch plunger 97, consequently, when the inner end of the lever 98 is raised the outer end will be lowered to close the switch 96. The lever extends directly over the diaphragm plunger 93 and the intermediate portion of the lever is provided with an adjustable bearing screw 101 which normally rests upon the upper end of the plunger. The extreme inner end of the lever is provided with a keeper notch 102 for a purpose which will later appear. Also carried by the plunger head 94 is a supplemental plunger rod 103 and this plunger actuates an outer trip lever 104. The outer end of the lever 104 is rockably mounted on the pivot pin 99 and operates independently of the switch lever 98. It can be seen, however, that the two plungers 93 and 103 operate in synchronism. The trip lever 104 carries an adjustable bearing screw 105 which normally rests upon the upper end of the plunger 103. The inner end of the trip lever rockably carries for free swinging movement a trip crank 106 and the lower end of this crank carries a laterally extending trip finger 107. Arranged between the trip lever 104 and the bridge 91 is a latch plate 108 rockably mounted at its lower outer corner on a pivot pin 109 carried by the bridge 91. The upper outer corner of the latch plate carries a laterally extending latch pin 110 which extends over the bridge for movement into the keeper notch 102 and under the switch lever 98 to hold the switch lever raised and in circuit closing position at certain times, as will be later brought out. It is to be noted, however, that due to the fact that the latch plate extends a material distance inward beyond the pivot pin 109, that the plate tends to swing downwardly and inwardly for moving the latch pin 110 toward and under the switch lever 98. However, when the switch lever is in its lowered position, the forward end of the switch lever above its latch notch 102 engages the latch pin and prevents inward and downward swinging movement of the switch plate. The plate is provided with a guide slot 111 and the inner wall of this slot adjacent to its lower end is provided with a cam shaped trip shoulder 112. The trip pin 107 on the trip crank 106 extends inwardly toward the latch plate and into the lower end of the slot normally below the trip shoulder 112.

Briefly considering that the switch lever 98 is in its lowered position with its outer end raised and the latch plate in its non-latching position, movement up and down of the plunger 103 under influence of pressure acting on the diaphragm will not affect operating conditions of the latch plate and the trip finger 107 will merely ride up and down in the slot 111. When pressure acting on the diaphragm reaches a certain predetermined high value both plungers 93 and 103 will be raised to such an extent that the inner end of the switch lever 98 will be pushed up and the trip finger 107 will be at the upper end of the slot 111. At this time, the latch plate will swing inwardly and downwardly and the latch finger 110 will ride under the inner end of the lever 98 into the keeper notch 102 and the switch lever will be held with its inner end in a raised position and its outer end in a lowered switch closing position. The above condition will continue to repeat latching and unlatching of the electric switch at the rate of once for every complete stroke of the air pump, or just as long as there is a sufficient amount of mix present in the evaporator or freezing cylinder 16. Upon the withdrawal of mix from the evaporator cylinder 16, the necessary high pressure will not be attained, due to the fact that there is more space in which a given volume of air is to be compressed. Therefore, the diaphragm 86 will not reach its maximum locking height. The switch will not stay in an electrically closed circuit position. This condition allows more mix to be pumped into the cylinder, thereby reducing the space in which the air is to be compressed, gradually resulting in a higher ultimate air pressure; thereby again causing the diaphragm and the plungers to reach higher and trip latch 108 can lock the switch for that particular stroke of the air pump in an electrically closed circuit position. Now, at the start of the next stroke of the air pump, the diaphragm and plungers will release the trip pin and plate, but if there is a sufficient amount of mix in the cylinder, it will again latch the plate and it will stay latched or in an electrically closed circuit position during the discharge of the piston of the pump for the mix. When the diaphragm 86 and the plungers 93 and 103 lower, the trip pin will ride to the lower end of the slot in the latch plate below the trip shoulder 112. As diaphragm 86 rises slightly the trip lever 104 slightly rises, and the trip finger engaging the trip shoulder 112 will rock the trip plate 108, moving the latch finger 110 away from the switch lever 98 and out of the keeper notch 102 allowing the lowering of the inner end of the switch lever and the opening of the switch. The trip finger 107 now merely rides back and forth in the slot 111 until enough or sufficient amount of mix has been pumped into the evaporator cylinder 16, thereby reducing the space in which the air is to be compressed and the plungers are raised to their topmost position with the switch lever again actuated. The air pump 32 operates a predetermined number of strokes per minute, say at a rate of fourteen strokes per minute and therefore the mechanism R is taking fourteen volume readings per minute. It is well to note at this time, that on the inward stroke of the piston 53, that the cup 54 thereof is compressing the air from atmospheric pressure to its maximum compression (approximately 13¾ lbs. pressure per square inch) which will operate the trip lever. On the return stroke of the air pump, there is no air removed from the cylinder as the compressed air is allowed to re-expand to its normal atmospheric pressure. This latter statement does not apply in the case of where some mix has been drawn from the freezing cylinder through the spigot 18, when the piston cup 54 was compressing the air and returning to the end of its stroke, as at this time, due to the fact that some mix has been withdrawn, the cup 54, just before the very end of its stroke, will have reached its normal atmospheric pressure. Any additional return stroke will actually create a slight vacuum, but this vacuum will be instantly relieved and restored to normal atmospheric pressure at the moment that the cup 54 uncovers the vent ports 61 and 62 in the pump cylinder at the end of the pump stroke. It should be borne in mind that this air compression stroke starts at atmospheric pressure each and every time. The opening or port 62 in the pump cylinder is only for the purpose of breathing, as the piston moves in and out of the cylinder. With the piston making approximately fourteen strokes per minute, the diaphragm 86 is distended and operating the same number of times per minute. If the volume of air in the cylinder 16 has increased through the withdrawal of a small amount of mix, then, of course, the diaphragm is not moved high enough to allow the latch finger 110 to lock the switch arm, due to insufficient air pressure. However, if there is sufficient amount of mix in the freezing cylinder and the volume of air thereby being reduced, then the piston of the air pump on its compression stroke will raise the pressure of air sufficiently to overcome the predetermined spring setting of the reading mechanism, thereby latching the switch lever and then dropping back to normal, and the switch lever is in its latched position. On the following stroke of the piston of the air pump, the diaphragm will once again compress the spring 95 and at the same time raise the trip lever 104 releasing the latch. When the latch is released, the solenoid 76 is not powered or energized and consequently, the valve 75 falls onto its seat, but this operation is taking place during the suction stroke of the piston for the mix, and the mix is being pulled into the mixing cylinder 37. However, if a sufficient amount of mix is in the freezing cylinder 16, the switch once again will be latched, holding the solenoid valve 75 off of its seat during the return stroke of the piston for the air pump and the piston for the pump for the mix; thereby causing the pulsation of the mix back and forth. This repeated latching and unlatching of the switch and energizing or powering the solenoid takes place on each and every stroke of the piston of the air pump when there is a sufficient amount of mix in the freezing cylinder 16.

With this brief description of the operation of the reading mechanism R in mind, it now can be seen that the operation of my improved device for controlling the automatic delivery of liquid mix and air to the freezing cylinder of the custard making machine is as follows: considering that the custard making machine C is in normal operation; and the freezing cylinder 16 is filled with the desired amount of the frozen product, the volume of air in the freezing cylinder will be low or reduced, it being remembered that the stroke of the piston of the air pump is constant and the resulting pressure at the end of each stroke will depend entirely on the space in which the air is being compressed, and consequently the diaphragm 86 of the reading mechanism will be raised to its extreme height and the switch 96 will be closed. This position of the switch lever 95 is shown in Figures 4, 6, 8, 9 and 11. Consequently, the solenoid 76 is energized and the plunger valve 75 will be raised above its seat 74. With the liquid mix pump 31 and the air pump 32 in operation, it can be seen that on outward movement of the plunger 36 of the pump 31, mix will be sucked in through the conduit tube 73, passageway 72, past the valve 74, passageway 40 and in cylinder 70. On the inward stroke of the piston 36, the mix will be forced out through the passageway 40, past the valve 74 and back into conduit 73 and the liquid mix will be pulsated back and forth. As the flow of the mix is unrestricted ball valve 79 will be held on its seat and no mix will enter the freezing cylinder. During this time, the air pump will be in operation, but the air in the freezing cylinder will be merely circulated back and forth and the actual volume of air in the freezing cylinder 16 will remain constant. During this period, on the outward stroke of the air pump, the diaphragm 86 will be lowered but the switch lever will be held in its switch operating position by the latch pin 110. On the inward stroke of the piston for the air pump, and if the volume of air in the freezing cylinder is still low, the diaphragm 86 will again be raised to its topmost position to reset the switch lever 98 to its circuit closing position which was temporarily unlatched for an instant by the engagement of the trip pin 107 with the trip shoulder 112.

Upon withdrawal of a certain amount of the frozen product and a consequent increase of the volume of air in the freezing cylinder, the diaphragm 86 will be raised only a sufficient distance on the operating stroke of the piston of the air pump to permit the trip pin 107 to actuate the latch plate 108, through its contact with the trip shoulder 112 so that the latch pin 110 will move away from the switch lever 98. The switch lever 98 will now fall by its weight and allow the raising of the switch plunger 97 to open the switch and the circuit through the solenoid 76. Hence, the plunger valve 75 will drop to its seat and the liquid mix will be trapped in the passageway 40, and on the inward stroke of the piston 36 the liquid mix will be forced past the valve 79 and into the freezing cylinder. It can be seen that the piston 53 and the air pump move forwardly with the piston 36 for the liquid mix and the piston 36 is forcing the mix into the freezing cylinder. However, the piston 53 of the air pump 32 is merely forcing out air into the atmosphere through opening 62 and this opening is merely a breathing aperture as stated. On the outward stroke of the piston 36, air is being compressed by the piston 53 into the freezing cylinder for the purpose of creating higher air pressure. If this pressure is high enough, it will operate the trip lever, as stated. (If the pressure is not high enough, the trip lever plate 108 will not lock the switch.) The pump 31 for the liquid mix will now operate as a direct pump, thereby pumping mix into the freezing compartment and reducing the air volume in the cylinder. This operation continues until the freezing cylinder is again filled with the desired quantity of mix which results in the lowering of the volume of air due to the displacement of the air by the mix, resulting in a smaller space to compress a given amount of air and higher air pressure and the holding of the switch lever 98 in its closed position.

From the foregoing description it can be seen that I have provided a sensitive but accurate means for insuring the proper quantity of liquid mix to a freezing cylinder at the proper time based on the volume of air in the freezing cylinder.

It should be noted that the system can be made to operate by either reading the compression ratio or the vacuum ratio. In other words, the air pump 32 would create a pressure in the freezing cylinder 16 in either case. In the description above, the pressure is read on the compression stroke of the air pump, the mechanism R could also be made to read on the return stroke and function according to the difference in vacuum.

Various changes in details can be made without departing from the spirit or the scope of this invention, but what I claim as new is:

1. In an ice cream or like frozen product making machine including a closed freezing cylinder and means for aerating and feeding the product toward one end of the cylinder; means for feeding a liquid mix to the cylinder including a pump, a feed line for the mix leading from the pump to the cylinder, a check valve in said line, a supply line for the mix leading to the pump, means for supplying air to the cylinder including an air pump operated synchronously with the pump for feeding liquid mix to the cylinder and means for controlling the flow of mix from the supply line to the pump including a solenoid operated valve; a switch for controlling the circuit to the solenoid and a pressure sensitive diaphragm responsive to the varying air pressures as generated by the air pump for opening and closing the switch.

2. In an ice cream or like frozen product making machine including a closed freezing cyinder and means for aerating and feeding the product toward one end of the cylinder; means for feeding a liquid mix to the cylinder including a pump, means for supplying air to the cylinder including a pump and a conduit, means for synchronously operating the pumps, a feed line for the liquid mix leading from the pump to the cylinder, a check valve for preventing the return of the mix from the cylinder to the feed line, a supply line for the mix leading to the pump and means for controlling the flow of mix from the pump including a solenoid operated valve, a switch for opening and closing a circuit to the solenoid operated valve, and pressure sensitive means having communication with the conduit for actuating the switch.

3. In an ice cream or like frozen product making machine as defined in claim 2, and said pressure sensitive means including a diaphragm, a plunger engaging the diaphragm at all times, a pivoted switch operating lever disposed above the plunger and actuated by the plunger.

4. In an ice cream or like frozen product making machine as defined in claim 2, and said pressure sensitive means including a diaphragm, a plunger actuated by and engaging the diaphragm at all times, a switch operated lever pivotally mounted above the plunger and actuated thereby, means for latching the lever in a raised circuit closing position for holding the solenoid operated valve in an open position, and means for releasing the latch by the rise and fall of the plunger.

5. In an ice cream or like frozen product making machine including a closed freezing cylinder and means for aerating and feeding the product toward one end of the cylinder; means for feeding a liquid mix to the cylinder including a reciprocating pump, a feed line for the liquid mix having communication with the pump and the freezing cylinder, a check valve for controlling the flow of mix to the feed line, a supply line for the mix having communication with the pump, a solenoid operated valve for controlling the flow of mix from the feed line to the pump, a reciprocating pump for supplying air to the cylinder, a conduit for the air leading from said last named pump to the cylinder, means for synchronously operating said pumps, the compression stroke of the pump for air being opposite to the pressure stroke of the pump for liquid mix, a pressure sensitive reading mechanism having communication with the air for the conduit, a switch for opening and closing the circuit for the solenoid operated valve, and means for operating the switch from the pressure sensitive means.

6. In an ice cream or like frozen product making machine as defined in claim 5 and said pressure sensitive means including a diaphragm, a spring pressed plunger urged into engagement with the diaphragm, a switch lever pivotally mounted above the plunger and actuated by the plunger for actuating the switch, the diaphragm being in an extreme raised position for operating the lever to close the switch and the circuit through the solenoid valve to raise the valve off of its seat and permit free flow of liquid mix back and forth from the pump for the mix to the supply line, means for latching the lever in its raised circuit closing position, and means for releasing the latch and the lever upon normal fluctuation of the diaphragm under influence of the pump for the air.

7. In an ice cream or like frozen product making machine as defined in claim 6 and said latch including an over balanced pivoted latch plate, a laterally extending latch pin adapted to engage under the switch lever when the latch plate is in its over balanced position, said latch plate having a slot and a cam shoulder adjacent to the lower end of the slot, said means for releasing the latch including a rockable lever, a plunger rod actuated by the diaphragm engaging said last named lever, a trip crank pivotally secured to said last named lever and a trip finger on said crank adapted to ride in said slot and against said cam shoulder for rocking the latch plate to move the latch pin from under the switch lever.

8. In an ice cream or like frozen product making machine including a closed freezing cylinder and means for aerating and feeding the product toward one end of the cylinder; means for feeding a liquid mix to the cylinder including a reciprocating pump for the liquid mix, a feed line for the liquid mix having communication with the pump and the cylinder, a supply line for the mix having communication with the pump and the feed line means for supplying air to the cylinder including an air pump operated synchronously with the mix feeding pump, a weighted check valve for preventing the return of the mix from the cylinder to the pumps for the mix, a solenoid operated valve for controlling the flow of mix from the supply line to the pump and to the feed line, said solenoid operated valve when in its open position permitting pulsation of the liquid mix back and forth from the pump to the supply line and when in its closed position shutting off flow of mix to the pump from the supply line and permitting opening of the ball check valve upon compression stroke of the pump, and pressure sensitive control means responsive to the varying air pressures as generated by the air pump for opening and closing a circuit to the solenoid operated valve.

9. In an ice cream or like frozen product making machine as defined in claim 8 and a pump for supplying air to the cylinder including a conduit leading from the pump for air to the cylinder, said pressure sensitive means having communication with the air pump and conduit for air.

10. In an ice cream or like frozen product making machine as defined in claim 8, and means for supplying air to the cylinder including a reciprocating pump and a conduit for air leading from the pump to the cylinder and said pressure sensitive means including a diaphragm exposed to differential of pressure in the conduit.

11. In an ice cream or like frozen product making machine as defined in claim 10, said feed line for mix communicating with the cylinder adjacent to the lower end thereof and the conduit for air communicating with the cylinder adjacent to its upper end.

12. In an ice cream or like frozen product making machine as defined in claim 10, and means for synchronously operating the pumps.

13. In an ice cream or like frozen product making machine including a closed freezing cylinder and means for aerating and feeding the frozen product toward one end of the cylinder; means for feeding a liquid mix to the cylinder including a pump, means for supplying air to the cylinder including a pump, a common casting for supporting the pumps; said pump for the liquid mix including a cylinder and a reciprocating plunger piston, said pump for air including a cylinder and a piston; means for synchronously operating the pistons; said casting having a vertical passageway for liquid mix communicating with the inner end of the cylinder of the pump for liquid mix, the casting having a cavity in communication with the passageway; a feed line for liquid mix having communication with the cavity; a weighted ball check valve above the cavity for controlling the flow of mix in one direction to the feed line, said casting having a second passageway communicating with the cavity at one side of the ball check valve, a supply line for liquid mix communicating with the second passageway; a check valve normally held on its seat by its weight for controlling the flow of liquid mix to the cavity from the supply line, a solenoid coil for raising the second valve to an open position upon the energizing of the coil, said casting also having a way for air communicating with the inner end of the cylinder of the pump for air, a conduit leading from said way to the cylinder, and pressure sensitive means including a diaphragm exposed to the air in the way for opening and closing the circuit to the solenoid.

References Cited in the file of this patent

UNITED STATES PATENTS

| | | |
|---|---|---|
| 2,059,485 | Payne | Nov. 3, 1936 |
| 2,522,648 | Tachella | Sept. 19, 1950 |
| 2,559,032 | Tachella | July 3, 1951 |
| 2,560,664 | Sammy | July 17, 1951 |
| 2,687,019 | Swenson | Aug. 24, 1954 |
| 2,760,344 | Oltz | Aug. 28, 1956 |

FOREIGN PATENTS

| | | |
|---|---|---|
| 349,878 | Italy | June 30, 1937 |